United States Patent [19]

Sheh

[11] Patent Number: 4,510,644
[45] Date of Patent: Apr. 16, 1985

[54] FISHING SCALING APPARATUS

[76] Inventor: Chen-Piau Sheh, No. 56, Taiping Rd., Yuanbei Subward, Homei Town, Changhua, Taiwan

[21] Appl. No.: 410,023

[22] Filed: Aug. 20, 1982

[51] Int. Cl.³ .............................................. A22C 25/02
[52] U.S. Cl. ............................................................. 17/64
[58] Field of Search .................. 17/53, 64, 65, 21, 46, 17/51

[56] References Cited

U.S. PATENT DOCUMENTS

| 1,294,140 | 2/1919 | Montgomery | 17/64 |
| 1,694,018 | 12/1928 | Mudge et al. | 17/64 |
| 4,004,321 | 1/1977 | Harrison | 17/71 X |
| 4,199,840 | 4/1980 | Crane | 17/1 G X |

Primary Examiner—Willie G. Abercrombie
Attorney, Agent, or Firm—Kirschstein, Kirschstein, Ottinger & Israel

[57] ABSTRACT

A fish scaling means include a pair of coil spring scalers, an entry guider and a scaled fish belt conveyer. The entry guider is formed of a pair of coil springs of elliptical cross section mounted upstream of the coil spring scalers. The belt conveyer is mounted downstream of the coil spring scalers for receiving the scaled fish from the coil spring scaler. The linear transporting speed of the belt conveyor is less than that of the advancing fish being scaled between two coil spring scalers so as to hinder the fish from advancement in the coil spring scaler, and thus more complete scaling is accomplished.

2 Claims, 2 Drawing Figures

FISHING SCALING APPARATUS

BACKGROUND OF THE INVENTION

The present invention is related to a fish scaling apparatus, and particularly to an automatically-operated fish scaling apparatus.

PRIOR ART

A conventional scaler is manually operated. Since the flying direction of the scales stripped from the fish cannot be controlled while scaling manually, it becomes a rather troublesome problem to avoid the taint of a fishy taste made by flying scales. Thus an improvement on conventional scalers is attempted to be made.

SUMMARY OF THE INVENTION

Accordingly, a fish scaling apparatus comprises, a housing; a pair of flexible scaler members of circular cross section journalled for rotation in the housing, aligned in parallel with each other in their axial direction and rotating in opposite directions so as to provide a linear downward transporting force to a fish entered therebetween; flexible guide entry means mounted in the housing and upstream of said flexible scaler members for passing the fish to said flexible members; and conveying means mounted in the housing downstream of said flexible scaler members to receive the fish from said flexible scaler members and to transport subsequently the fish away therefrom, in which the linear speed of said conveying means is lower than the linear transporting speed of said flexible scaler members so as to generate a hindering force to the fish while it is still being transported and scaled by said pair of flexible scaler members.

OBJECTS OF THE INVENTION

In accordance with one aspect of the present invention, the conveying means comprise two flat belts, operating in a parallel direction and driven at the same speed, wherein the planes of the belts are spaced with a passage therebetween for receiving the fish from said flexible scaler members.

In accordance with another aspect of the present invention, the flexible guide entry means comprise at least two lengthwise parallel spaced first coil spring members providing a passage for engagingly passing the fish therethrough.

In accordance with further aspect of the present invention, each of said pair of flexible scaler members comprises a third coil spring member having its ends journalled for rotation in the housing, said third coil spring members being driven to rotate in opposite directions relative to one another. A plurality of annular scalers are fixedly mounted on the convolutions of said second coil spring members and each scaler is spaced an angular distance from the adjacent scaler on both sides of the spiral length of each said second coil spring member. Preferably, the angular distance is 120° (see FIGS. 1 and 2).

It is an object of the present invention to provide a fish scaling apparatus which can eliminate most of the manual work involved in conventional scalers.

It is another object of the present invention to prevent the scaling worker from contamination by scales of a fishy taste. These and other objects will be apparent by illustrating a preferred embodiment with reference to the following drawings, in which:

DETAILED DESCRIPTION OF THE PREFERRED EMBODIMENT

Figure 1:
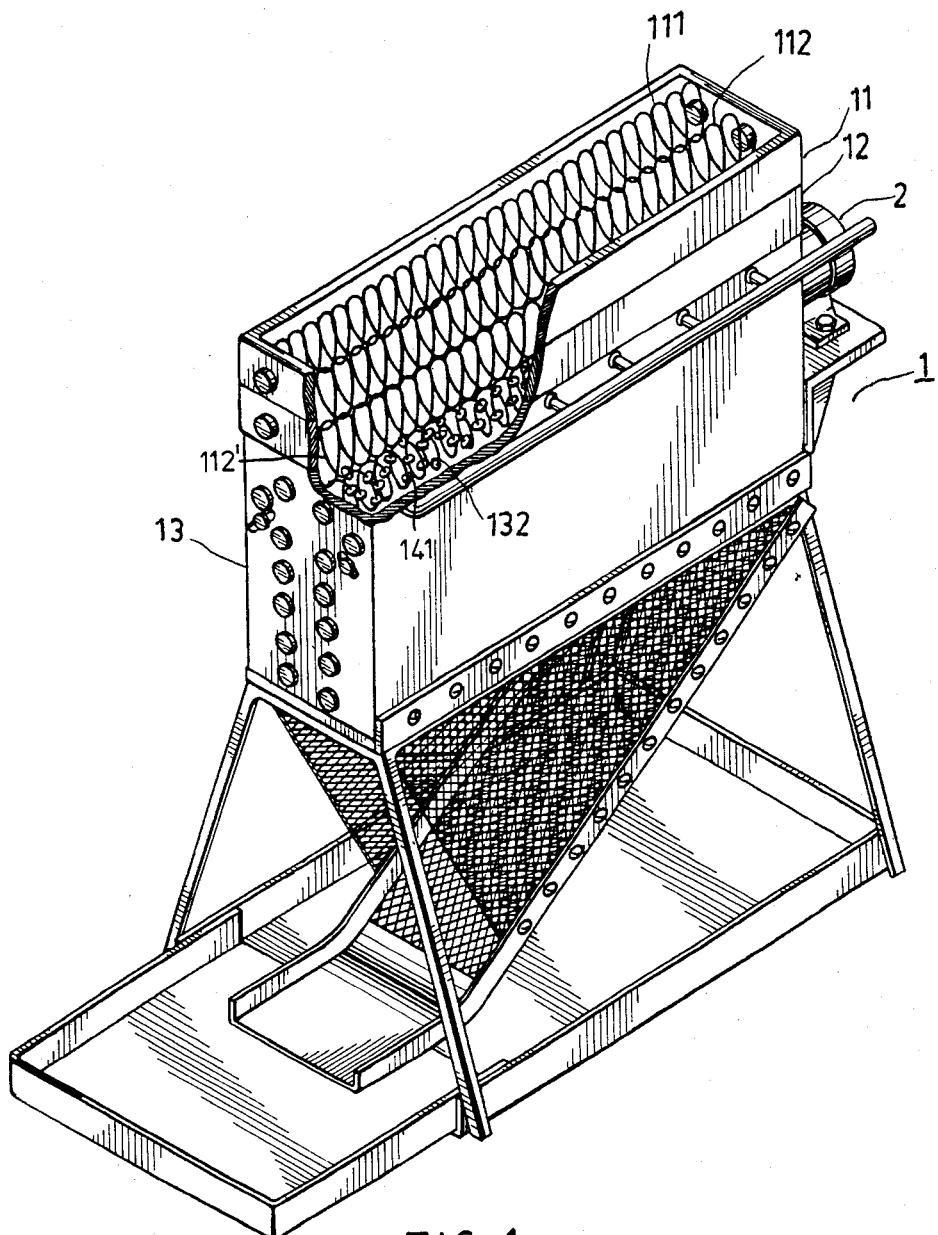
FIG. 1 is a perspective view of an embodiment according to the present invention in partial section.
Figure 2:
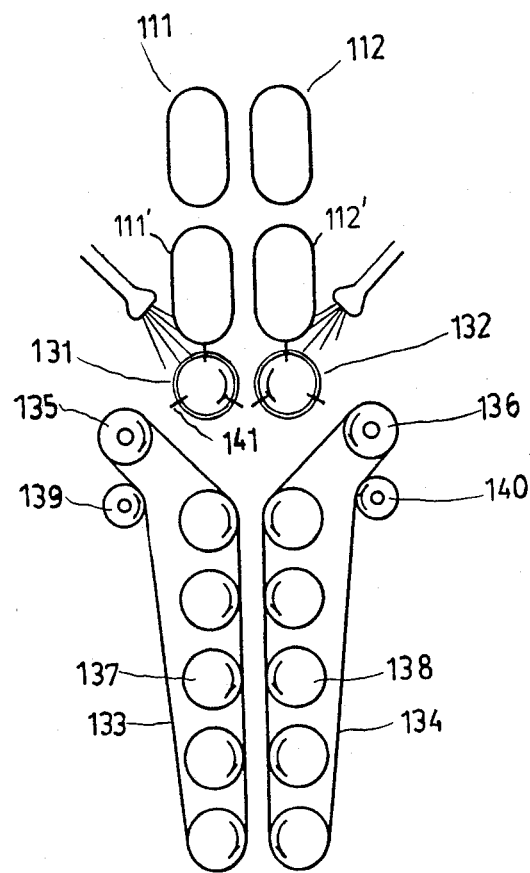
FIG. 2 is a schematic sectional view of an embodiment according to the present invention.

As shown in the figures, a fish scaling apparatus 1 of the present invention includes two vertically registered upper housings 11 and 12, a fish scaling housing 13 immediately below the lowermost housing 12, a drive motor 2 alongside the fish scaling housing and a gear box (not shown). A second pair of horizontally registered mutually spaced coil spring members 131, 132 are journalled in the fish scaling housing 13. The third pair of coil spring members 131, 132 are driven to rotate oppositely relevant to one another by the gear box. As clearly shown in FIG. 2, a plurality of scalers 141 are carried by and radially project from convolutions of the individual third coil spring members 131, 132, the annular scalers 141 being mutually spaced apart evenly, e.g. 120° (see FIGS. 1 and 2). Each of the third coil spring members 131, 132 is sleeved by a flexible tube such as a rubber tube to immobilize the scalers 141 relative to the third coil spring members 131, 132. Above the third coil spring members 131, 132 are two sets of a first pair of parallel horizontally registered mutually spaced coil spring members 111, 112 and a second pair of horizontal mutually spaced coil spring members 111', 112'. The coil spring members 11, 112 and 111', 112' are mounted separately in the two upper housings 11 and 12, respectively. Each of the first and second coil spring members is vertically aligned with a corresponding one of the second coil spring members 131, 132 for engagingly guiding the entering fish to a passage between the third pair of coil spring members 131 and 132. By means of the opposite rotation of two third spring members 131, 132 the introduced fish will be scaled while moving downward.

Below the third coil spring members 131, 132 two flat belts are driven at the same speed by respective pulleys 135, 136. Each of the flat belts runs on a series of fourth coil spring members of circular cross section 137, 138 so that the scaled fish will be kept in loose engagement with the two flat belts 133, 134 while advancing therebetween. Adjusting rollers 139, 140 are mounted to approach the flat belts 133, 134 from outside for regulation of the belt's tension.

Practically, the revolution speed of the third coil spring members is kept at about 200 rpm so as not to cause much serious swaying motion of the third coil spring members and thus the fish will advance forward smoothly. The revolution speed of the pulleys 135, 136 is kept at about 100 rpm so that the belts supply a linear transporting force to the scaled fish on one hand, and on the other hand a hinder force is generated due to the fact that different revolution speed will more or less keep back the advancement of the fish while scaling. Thus a more complete scaling action is achieved.

With the invention thus explained, it is apparent that variations and modifications can be made without departing from the spirits of the embodied invention. It is intended that the scope of the present invention be defined by the appended claims.

I claim:
1. A fish scaling apparatus comprising:
(A) a housing;
(B) flexible guide entry means,
   (i) means mounting said flexible guide entry means in the housing,
   (ii) said flexible guide entry means receiving and feeding downstream fish introduced into the fish scaling apparatus;
(C) a pair of flexible elongated scaler members of transverse circular cross-section,
   (i) means mounting said scaler members for rotation in the housing downstream of the flexible guide entry,
   (ii) said mounting means for said scaler members supporting said scaler members in parallel spaced apart relationship,
   (iii) means to rotate said scaler members in opposite directions so as to jointly provide
      (a) a linear transportation force to transport downstream fish fed between them by the flexible guide entry means and
      (b) remove scales from said fish; and
(D) conveying means,
   (i) means mounting said conveying means in the housing downstream of the flexible scaler members in a position to receive scaled fish from said flexible scaler members and to transport scaled fish away therefrom;
(E) the linear transporting speed of said conveying means being less than the linear transporting speed of said flexible scaler members so as to generate a hindering force to fish while they still are being transported and being scaled by said pair of flexible scaler members;
(F) said conveying means comprising two flat belts having reaches in parallel and spaced from one another,
   (i) means to drive said reaches at the same speed and in the same downstream direction,
   (ii) so as to provide a passage for receiving scaled fish from the pair of flexible scaler members;
(G) said flexible guide entry means comprising at least two elongated parallel first coil spring members mutually spaced apart to provide a passage for engagingly passing fish therethrough and delivering them to the scaler members;
(H) each said pair of flexible scaler members comprising a second elongated coil spring member,
   (i) means to mount the ends of each coil spring member for rotation in the housing,
   (ii) a plurality of scalers carried by, and radially projecting from, convolutions of the second coil spring members,
   (iii) individual ones of the scalers being spaced apart from adjacent scalers angularly along the spiral length of each of the second coil spring members.

2. A fish scaling apparatus, according to claim 1, in which the angular spacing between adjacent individual scalers is 120°.

* * * * *